US012062465B2

(12) United States Patent
Said et al.

(10) Patent No.: US 12,062,465 B2
(45) Date of Patent: Aug. 13, 2024

(54) SYSTEM AND METHOD FOR BENDING CRYSTAL WAFERS FOR USE IN HIGH RESOLUTION ANALYZERS

(71) Applicant: UCHICAGO ARGONNE, LLC, Chicago, IL (US)

(72) Inventors: Ayman H. Said, Lombard, IL (US); Thomas Gog, Woodridge, IL (US); Jung Ho Kim, Naperville, IL (US); Emily K. Aran, Westchester, IL (US)

(73) Assignee: UCHICAGO ARGONNE, LLC, Chicago, IL (US)

( * ) Notice: Subject to any disclaimer, the term of this patent is extended or adjusted under 35 U.S.C. 154(b) by 0 days.

(21) Appl. No.: 17/892,020

(22) Filed: Aug. 19, 2022

(65) Prior Publication Data

US 2024/0062928 A1 Feb. 22, 2024

(51) Int. Cl.
*G21K 1/06* (2006.01)

(52) U.S. Cl.
CPC ......... *G21K 1/06* (2013.01); *G21K 2201/062* (2013.01); *G21K 2201/064* (2013.01); *G21K 2201/067* (2013.01)

(58) Field of Classification Search
None
See application file for complete search history.

(56) References Cited

U.S. PATENT DOCUMENTS 2,853,617 A 9/1958 Berreman
8,557,149 B2 10/2013 Maj et al.
9,761,340 B2 9/2017 Qian
10,175,185 B2 1/2019 Kawahara
2004/0107731 A1* 6/2004 Doehring ................ C03B 19/02 65/374.13
2010/0148530 A1* 6/2010 Michler .............. B29C 45/1418 156/245
2014/0360491 A1* 12/2014 Becker .................... F24S 20/20 65/17.4
2018/0011035 A1* 1/2018 Kawahara .......... G01N 23/2076

OTHER PUBLICATIONS

Ayman H. Said, et al., "Novel fabrication technique for high-resolution spherical crystal analyzers using a microporous aluminium base," Journal of Synchrotron Radiation, 2022, 29, pp. 749-754.

* cited by examiner

*Primary Examiner* — Hoon K Song
(74) *Attorney, Agent, or Firm* — CHERSKOV FLAYNIK & GURDA, LLC

(57) ABSTRACT

The invention provides a method for fabricating analyzers, the method comprising providing a radiation manipulating material on a first surface of a flexible support; contacting a second surface of the flexible support to a permeable mold, wherein the mold has a first flexible support contact surface and a second surface; and applying negative pressure to the second side of the flexible support to cause the flexible support to conform to the first flexible support contact surface of the mold. Also provided is a system for fabricating crystal analyzers, the system comprising crystal structures reversibly attached to a flexible support; a porous mold reversibly contacting the flexible support, wherein the mold defines a topography; and a negative pressure applied to the flexible support to cause the crystal structures to conform to the topography.

22 Claims, 4 Drawing Sheets

Prior Art

SYSTEM AND METHOD FOR BENDING CRYSTAL WAFERS FOR USE IN HIGH RESOLUTION ANALYZERS

CONTRACTUAL ORIGIN OF THE INVENTION

The U.S. Government has rights in this invention pursuant to Contract No. DE-AC02-06CH11357 between the U.S. Department of Energy and UChicago Argonne, LLC, representing Argonne National Laboratory.

BACKGROUND OF THE INVENTION

1. Field of the Invention

This invention relates to a method for manipulating radiation, and more specifically this invention relates to a method and system for manipulating ionic and non-ionic radiation for use in spectroscopy.

2. Background of the Invention

Theoretical energy resolution of spherical analyzers is determined by fundamental design parameters such as energy, crystal material, reflection chosen, and geometrical contributions. The required energy resolution depends on the measurements.

Factors related to the fabrication process of analyzers include figure errors, strain induced in the crystal, and long-term degradation of the spherical shape. These factors can substantially diminish the energy resolution of the analyzer. For example, typical fabrication processes include a crystal wafer being compressed between a concave and a convex die using a mechanical press. Often, the concavity and convexity of the dies are not exactly complementary.

FIG. 1 depicts such a mismatch between a concave die 2 and a convex die 3, which results in deficiencies of the produced bent crystals. Usually, a mismatch between the radius of the concave and convex dies results in less than ideal focusing compared to a perfect sphere. Bad energy resolution and low efficiency result.

The assembly of crystallites, taking the shape of the die, provide the means for focusing incoming radiation. Modern, inelastic x-ray spectrometers employ curved, bent and diced, analyzers to capture sufficiently large solid angles of radially emitted scattered radiation emanating from the sample.

Fabricating these intricate analyzers, especially when a resolution of a few milli-electron volts (meV) is required, is very time-consuming, expensive, and often hit-or-miss. The supporting slide, along with the crystal assembly, is permanently mounted on a spherical substrate through anodic bonding or gluing, and subsequently pressed by a convex-concave die or mold. Often, the gluing or bonding is compromised with repeated exposure to radiation.

A need exists in the art for a method and system for producing crystal analyzers for use in x-ray spectroscopy. The method and system should allow the crystals to be reused and even reshaped, in combination with vacuum molds of different radii, to accommodate various focusing radii and energy resolutions. The method and system should further eliminate the need for permanent bonding of crystals to its shaping substrate, thereby avoiding long term degradation of such bonding upon exposure of radiation.

SUMMARY OF INVENTION

An object of the invention is to provide a system and method for producing crystal analyzers that overcome many of the drawbacks of prior art.

Another object of the invention is to provide a system and method for producing reusable crystal analyzers. A feature of the invention is that the crystal is reversibly mounted to a mold consisting solely of a concave surface. An advantage of the invention is that both the crystal and the mold are reusable. Another advantage is that due to the elimination of state of the art's glue and the convex mold, the analyzers are easy to reproduce and therefore have very similar performance characteristics.

Yet another object of the invention is to provide an inexpensive system and method for producing crystal analyzers. A feature of the invention is that it eliminates the need for permanently bonding a crystal to a shaping substrate (i.e., elimination of an adhesive layer). An advantage of the invention is that it allows for improved figure errors (due to the elimination of a glue layer in between the concave mold and the supporting slide) and avoids long term degradation of permanent bonds, inasmuch as no permanent bonds exist in the invented construct. Process and material costs are thus substantially decreased.

Briefly, the invention provides a method for fabricating bent analyzers, the method comprising positioning a radiation manipulating material on a first surface of a flexible support; contacting a second surface of the flexible support to a permeable mold, wherein the mold has a first flexible support contact surface and a second surface; and applying negative pressure to the second side of the flexible support to cause the flexible support to reversibly conform to the topography of the first flexible support contact surface of the mold. The method eliminates the need for adhering or otherwise bonding crystals to molds. As such, the method is adhesive-free.

Also provided is a system for fabricating crystal analyzers or amorphous analyzers, the system comprising crystal or amorphous structures positioned upon a flexible support; a porous mold reversibly contacting the flexible support, wherein the mold defines a topography; and a negative pressure applied to the flexible support to cause the crystal or amorphous structures to conform to the topography. The amorphous structures may be bonded to the flexible support.

BRIEF DESCRIPTION OF DRAWING

The invention together with the above and other objects and advantages will be best understood from the following detailed description of the preferred embodiment of the invention shown in the accompanying drawings, wherein.

DETAILED DESCRIPTION OF THE INVENTION

Figure 1:
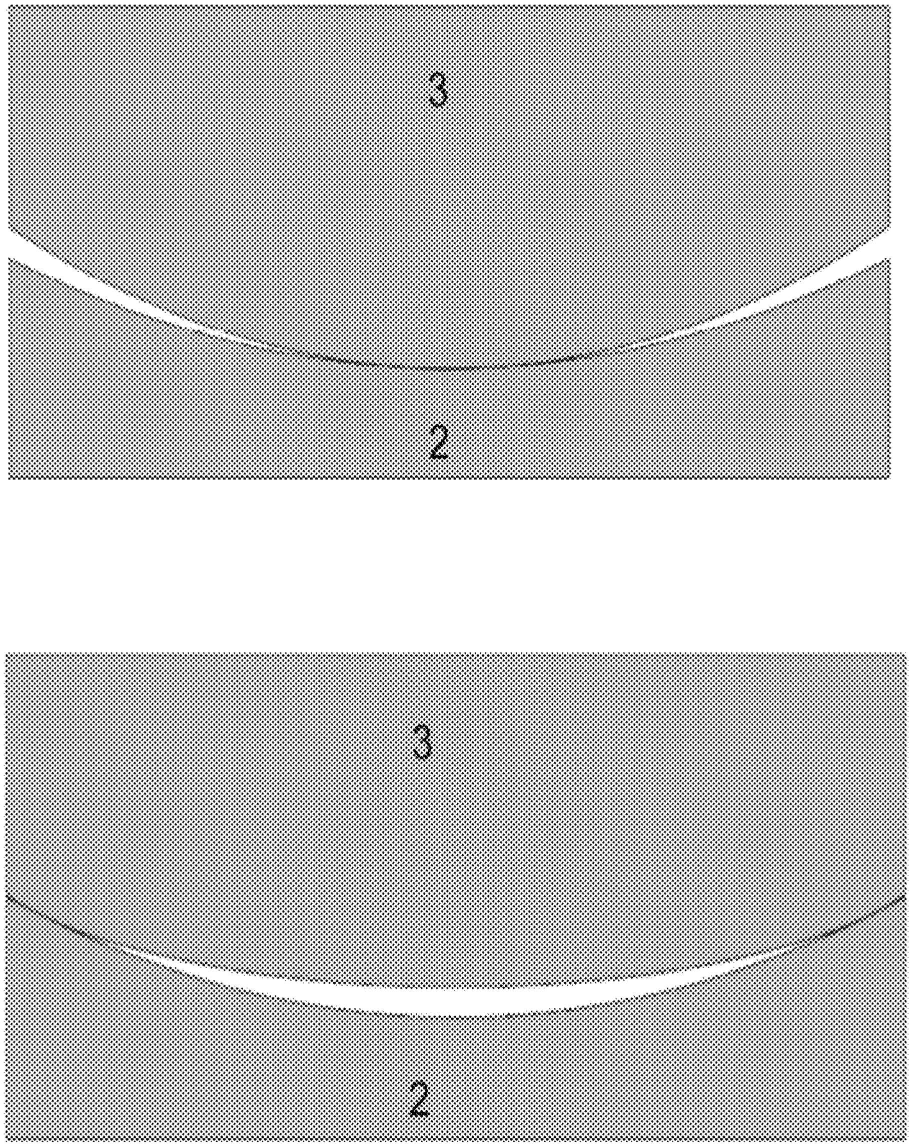
FIG. 1 is a schematic drawing of one of the deficiencies of state-of-the-art molds for producing curved crystal substrates.

The foregoing summary, as well as the following detailed description of certain embodiments of the present invention, will be better understood when read in conjunction with the appended drawings.

All numeric values are herein assumed to be modified by the term "about", whether or not explicitly indicated. The term "about" generally refers to a range of numbers that one of skill in the art would consider equivalent to the recited value (e.g., having the same function or result). In many instances, the terms "about" may include numbers that are rounded to the nearest significant figure.

The recitation of numerical ranges by endpoints includes all numbers within that range (e.g. 1 to 5 includes 1, 1.5, 2, 2.75, 3, 3.80, 4, and 5).

The following detailed description should be read with reference to the drawings in which similar elements in different drawings are numbered the same. The drawings, which are not necessarily to scale, depict illustrative embodiments and are not intended to limit the scope of the invention.

As used herein, an element or step recited in the singular and preceded with the word "a" or "an" should be understood as not excluding plural said elements or steps, unless such exclusion is explicitly stated. As used in this specification and the appended claims, the term "or" is generally employed in its sense including "and/or" unless the content clearly dictates otherwise.

Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

High-resolution spherical crystal analyzers are manufactured by preparing a diced crystal wafer in an assembly of suitable millimeter-sized crystallites mounted on a thin supporting substrate. ("High resolution" is construed herein by technique, so for example higher than the 100 meV typically experienced in resonant inelastic x-ray scattering or RIXS.) For lower energy resolution, an un-diced crystalline wafer is bent and glued directly to a spherical substrate. The invention is capable of generating analyzers to resolve energies ranging from 1 meV to 1000 meV.

The invention provides a method and system for manipulating radiation, including ionizing radiation (e.g., x-rays) and non-ionizing radiation (such as visible light, UV radiation light and IR radiation).

The invented technique eliminates the need for permanently bonding radiation manipulating materials to a forming mold, thereby enabling improved and more reproducible figure errors, avoiding long-term degradation of the permanent bond, and making both the forming base and the wafer reusable. Process and material costs are thus substantially decreased. The radius of curvature of the radiation manipulating materials is dependent only upon the topography of the forming mold. As such, radii ranging from 10 mm to infinity (i.e., a flat surface) may be obtained.

The analyzers comprise radiation manipulation material of a crystalline or non-crystalline nature. For example, radiation diffracting material may comprise crystals selected from the group consisting of quartz, germanium, silicon, sapphire, metal and combinations thereof. Non-ionic radiation reflecting material may comprise non-crystalline substrate selected from the group consisting of metal, glass, polymer, and combinations thereof. In general, metals are considered crystalline and made of many tiny single crystals. But amorphous metals exist, called metallic glass, and usually as an alloy of different elements. In instances were just metal is utilized as the radiation modification material, reversible binding of the metal to the underlying flexible support substrate may be effectuated with a magnetic field.

In situations where ionic radiation is to be utilized, the invention enables the production of reversibly curved crystal analyzers. These analyzers are used in x-ray spectroscopy (e.g., inelastic x-ray scattering). An embodiment of this application is a method for fabricating high-energy resolution diced spherical analyzers for resonant inelastic x-ray scattering spectroscopy (RIXS).

In this instance, the fabrication technique utilizes a micro-porous mold as a forming base constructed of a material rigid enough to hold a thin diced-crystal/support construct (i.e., wafer) under uniform vacuum forces. As such, the mold should be rigid relative to that of the construct so that the mold does not flex or bend, but rather retains its shape. The mean pore size of the material should be suitable to impart a negative pressure to the overlaying construct so as to prevent inadvertent movement during operation. Typical pore sizes range from approximately 5 microns to 25 microns, and ideally about 15 microns, depending on the commercial supplier of the mold substrate. Exemplary materials for the micro-porous mold comprise metal, ceramic, glass and combinations thereof. An exemplary material is aluminum having a thickness of approximately 15 mm. Commercially available aluminum molds with the aforementioned parameters may be obtained from Engis Corporation, Wheeling, IL.

In an embodiment of the invention, the entire contact surface of the mold is interspersed with pores so as to instill a homogeneous negative pressure pull across all regions of the underside of the wafer. For example, the porous mold may have more than 1000 pores per square mm of surface area, the pores extending transversely through the mold so as to confer fluid communication between its oppositely facing surfaces.

Due to manufacturing constraints, the curvature of the molds are not perfect. Any deviation of the curvature from a perfect sphere will cause distortions of the shape of the focal spot and increases in its size; both detrimental to achieving the desired energy resolution. Unwanted artifacts include smaller surface deviations such as surface roughness and also larger deviations described as figure errors, such as curvature errors from the perfect spherical form. (Elimination of the glue layer, which is a feature of the invention, will greatly help to avoid these distortions.)

In summary of this point, improved figure error results in improved focusing, inasmuch as all of the diffracted beam rays from the analyzer surface are focused to the same spot on the detector.

Dicing Detail

Figure 2:
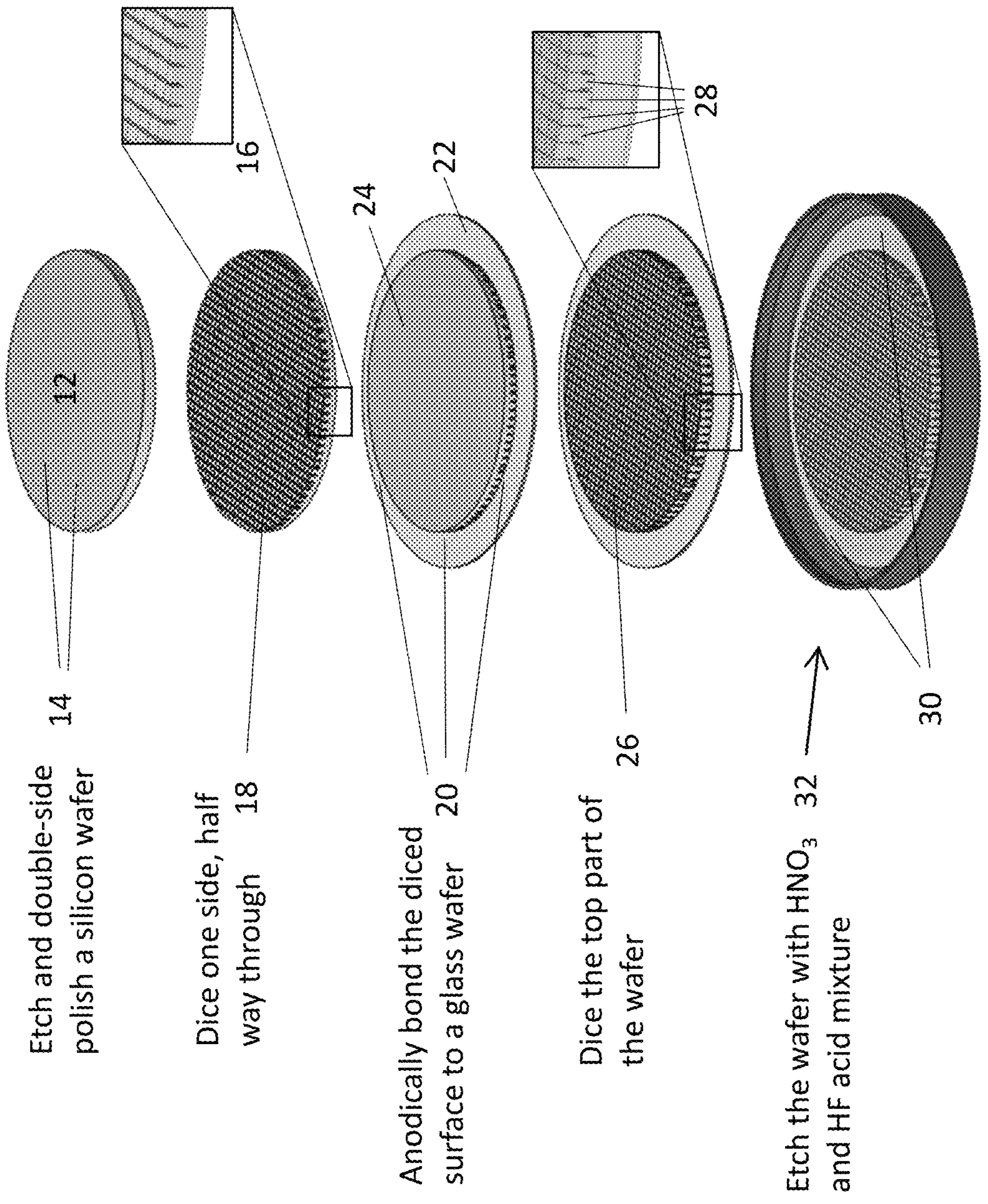
FIG. 2 is a schematic view of a method for generating crystals, in accordance with features of the present invention.

FIG. 2 depicts the diced or pixelated crystal preparation steps of the invented method, generally designated as numeral 10. Each of the diced crystals generated by dicing can be considered "pixels" and may be so referred to throughout this specification.

The pixels are generated as follows: A crystal substrate (e.g. a silicon substrate) 12 is first subjected to an etching and polishing step 14 on both sides. Then, a first side 16 of the substrate 12 is transversely cut or diced 18 half way through the thickness of the crystal substrate. That first diced side 16 is then bonded (e.g., anodically) 20 to a first surface of a radiotransparent, nonporous, and reversibly flexible support 22 such as a glass sheet to form a construct (i.e., wafer). At this point, a second, yet un-diced side 24 of the crystal substrate 12 is facing up in a direction opposite that of the flexible support 22 so as not to be in direct contact with the first surface of the flexible support 22.

This second side 24 of the crystal substrate 12 is then transversely cut in a second dicing step 26 in a manner to meet with opposing cuts generated during the first dicing step 18. As a result, individual crystals or pixels 28 are formed. Each of the smaller substrates define a six sided shape having side surfaces opposing adjacent smaller crystal substrates, a upwardly facing surface, and a downwardly facing surface contacting the support substrate. The downwardly facing surface of each of the smaller crystal substrates taken together form a continuous surface. Each of the upwardly facing surfaces of the smaller crystal substrates is adapted to receive x ray radiation.

The resulting construct 30 is then subjected to an etching step 32, for example by contacting the crystal with a nitric ($HNO_2$) and hydrofluoric (HF) acid mixture. This etching step facilitates removal of strained (damaged) surfaces along the grooves caused by the dicing action. Otherwise, any strain in the crystal will cause energy resolution degradation.

The construct 30 may then be subjected to a negative pressure wherein such pressure is reversibly applied to the underside of the reversibly flexible support 22. In an embodiment of the invented method, no negative pressure is applied directly to the crystal substrate or the individual pixels 28. Rather, the negative pressure is applied solely to the underside of the reversibly flexible support 22. This results in the generation of a mosaic of pixels, each pixel situated relative to each other in a strain free state, given that no forces physically contact the pixels. (Strain is any intrinsic deformation of the atomic order of crystal material, caused by mechanical forces such as mechanical dicing, mechanical bending and the like which may result from direct application of the vacuum pull.)

Figure 4:
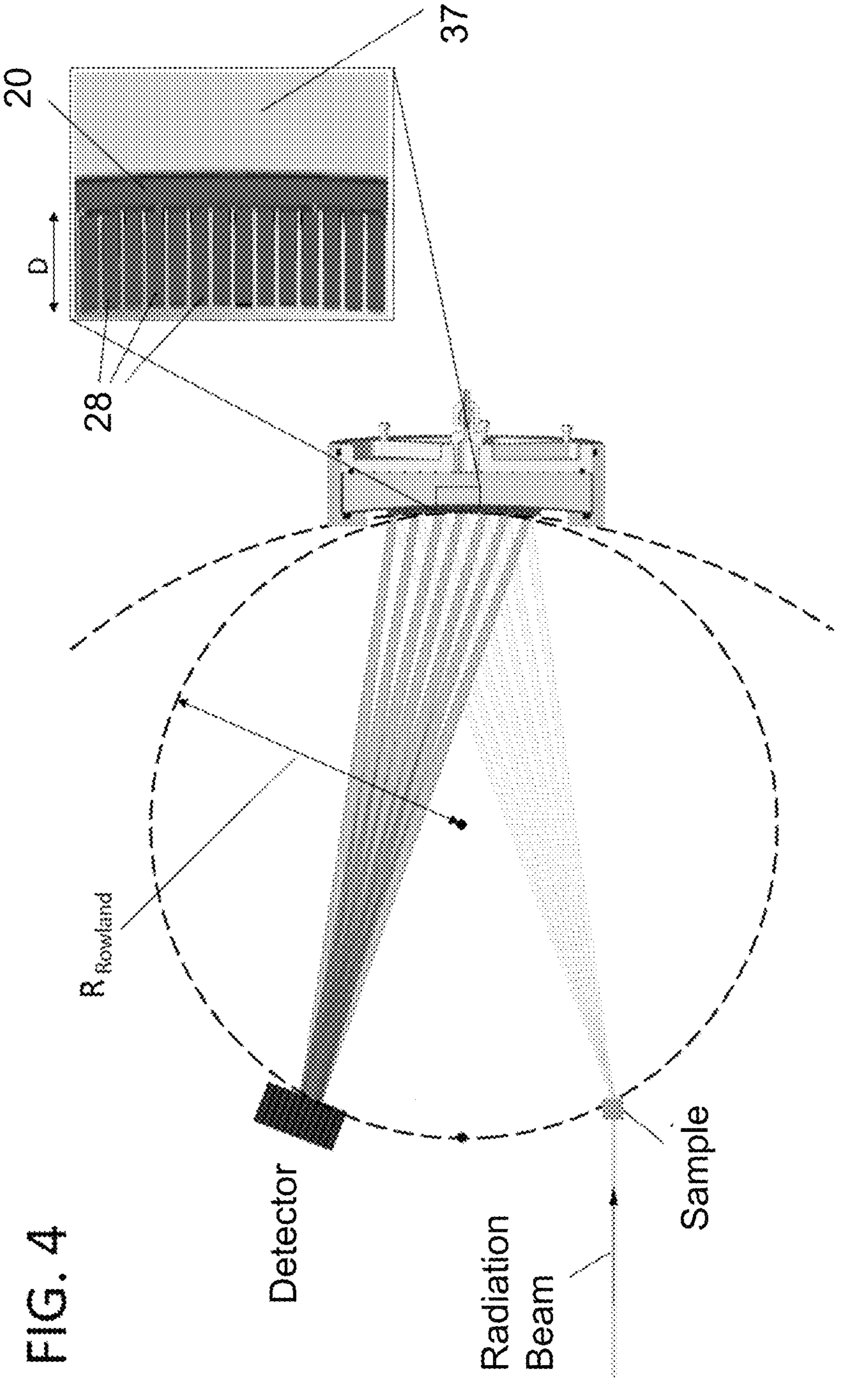
FIG. 4 is a schematic view of crystal pixels arranged on a curved surface to form a curved crystal mosaic reflecting radiation, in accordance with features of the present invention.

Two-dimensional crystal pixel arrays result, wherein all of the pixels focus the captured radiation to a single spot on the detector (see FIG. 4). The size of the focused image at the detector is twice the average diced crystal (i.e., pixel) size.

Figure 3:
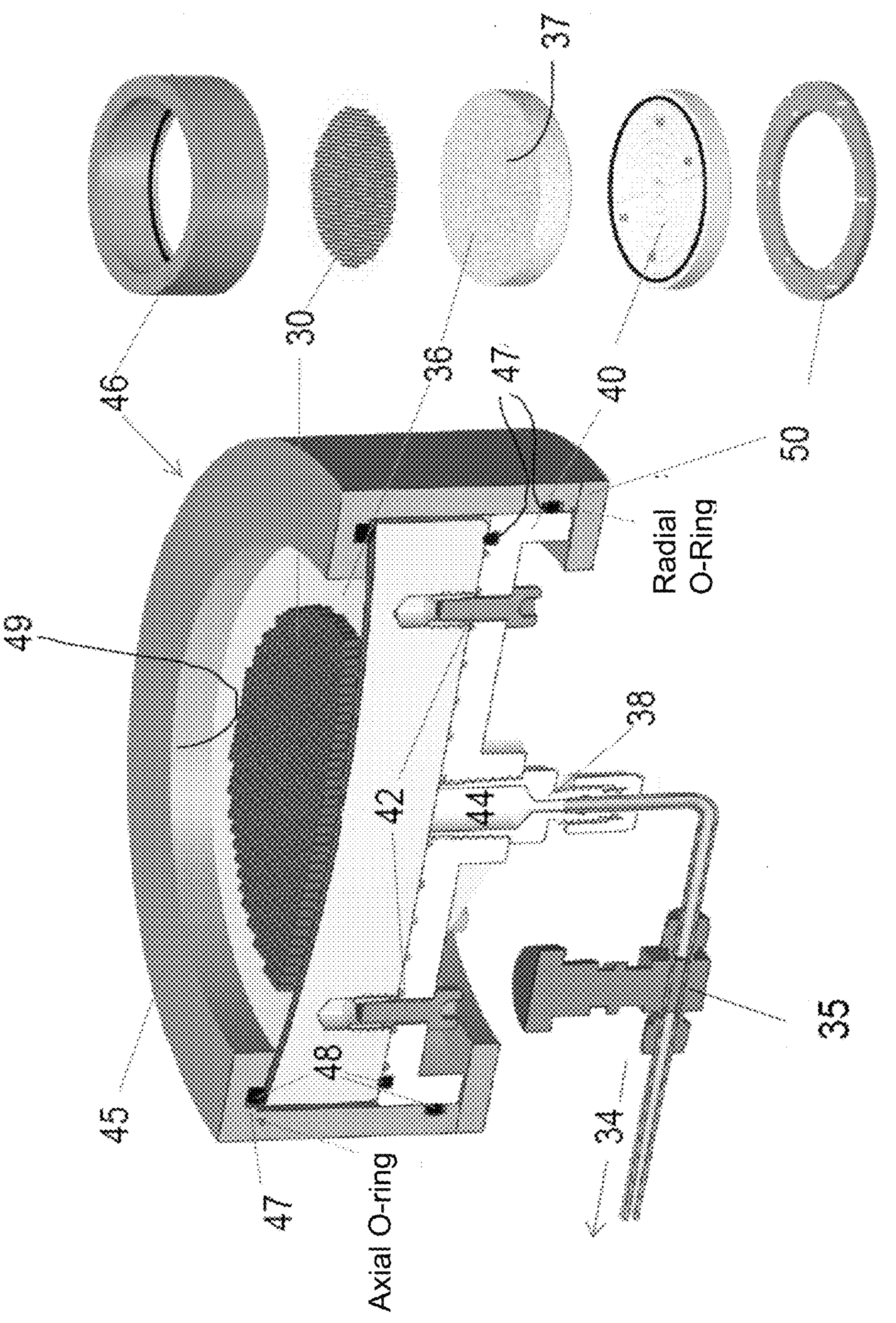
FIG. 3 is a schematic view of a method and system for producing reversibly bent crystals, in accordance with features of the present invention.

FIG. 3 is a schematic depiction of the invented process for reversibly shaping the construct 30. Negative pressure is applied to the underside of the nonporous construct such that the negative pressure is not in fluid communication with the crystals. This negative pressure may be affected via a vacuum pull 34 across the entire underside of the nonporous support surface 22, that underside facing in a direction opposite the surface of the support substrate 22 contacting the crystal substrate 12. A porous mold 36 is positioned between a vacuum port 38 and the construct 30 so as to support the underside of the construct (i.e. wafer) 30 in its entirety The vacuum port 38 is attached to a mounting plate 40 which in turn contacts the underside (flat, noncurved side) 37 of the mold 36.

The pores defining the porosity of the mold 36 are distributed throughout the mold such that when a vacuum is applied to the mold, the entire underside of the construct is subjected to the vacuum pull, thereby providing uniform vacuum forces. The negative pressure is continually applied during analysis of the radiation. When the negative pressure is removed, the construct may resort to its original non-curved shape and can even be utilized in a different mold having a different topography or radius of curvature (e.g., concavity.)

That the entire underside of the construct is subjected to the negative pressure obviates the need for a cutout or countersunk region to exist in the mold heretofore required to stabilize the construct to one area of the mold. As such, the construct 30 supporting surface of the mold may be continuous, smooth and devoid of any steps, countersunk regions or other structures which would otherwise limit where on the mold the construct 30 may be placed. This feature enables the construct 30 to be supported anywhere on the mold to be subsequently reversibly bent or otherwise shaped. Alternatively, a plurality of constructs may reside on the mold simultaneously and simultaneously shaped thereon.

Multi analyzer systems are also facilitated by the invention. In this instance, different regions of the mold may have different curvatures so as to generate different shaped constructs for use at the same time to analyze different radiation types.

Negative pressures applied to the construct 30 may range from $10^{-2}$ mBar to $10^{-6}$ mBar. A shut off valve 35 may be utilized to continually maintain the vacuum while allowing the vacuum pump (not shown) to be shut down. This will allow the assembly to be repositioned remotely from the vacuum pump while maintaining contact of the construct 30 to the mold 36.

Assembly Detail

A feature of the invented system is its vacuum shroud 46. The vacuum shroud 46 resembles a ring defining an upwardly facing continuous surface 45 and a downwardly facing surface 49 defining a plurality of annular grooves 47. The annual grooves is adapted to receive a plurality of O-rings 48. The vacuum shroud 46 is utilized to provide a hermetic seal to the assembly via this plurality of seals. Specifically, the O-rings are inserted within annular grooves 47 formed within circumferentially extending underside surfaces 49 of the shroud 46, with the wafer and porous base assemblies subsequently fitted within the shroud.

Exemplary assembly of the system begins by loading the shroud from below.

In an embodiment of the invention, assembly of the system begins by first fitting the vacuum shroud 46 with the O-rings 48 into their grooves 47. Then the crystal wafer construct 30 (either diced for high resolution applications, or undiced for lower resolution applications) is fitted into the shroud 46 from below, with the first surface of the support 22 opposing the underside surface 49 (e.g., the depending or inferior periphery) of the shroud 46. The first surface of the support 22 may physically contact a superior most O-ring. The porous mold 36, which is preassembled to a disk-shaped mounting plate 40, is subsequently fitted into the shroud 46, with the concave surface of the mold 36 facing the underside of the crystal wafer construct 30.

Before inserting the preassembled porous base 36 and the mounting plate 40 into the shroud 46, the mounting plate 40 may be preassembled with a vacuum port 38. The last item assembled to shroud 46 is the vacuum enforcement plate 50, which is placed on the underside of the mounting plate 40 and fastened to the shroud 46.

The mounting plate 40 is utilized to provide a vacuum port and vacuum seal to the flat surface 37 of the mold. The plate 40 is reversibly fastened to the underside of the porous mold 37 via a plurality of fasteners 42. A central region of the mounting plate forms an axially extending transverse aperture to afford access of the negative pressure pull to the underside of the construct 30. The aperture 44 may be threadably engaged with the vacuum port in a male-female configuration.

Annular grooves adapted to receive the O-rings may also be provided on upwardly facing, circumferentially extending surfaces of the mounting plate 40. In the embodiment shown in FIG. 3, the grooves may be formed in the periphery of an inwardly facing surface of the mounting plate, that surface opposing the underside surface 49 of the shroud 46.

A vacuum enforcement plate 50 is used to compress the O-rings even further as vacuum is pulled, i.e. to optimize a suitable vacuum seal. The vacuum enforcement plate is lastly placed on the bottom surface (i.e., the depending or downward facing surface) of the mounting plate 40, and fasted to the vacuum shroud 46, so as the vacuum pull progresses, the vacuum enforcement plate may be fastened (i.e., biased) further into the vacuum shroud 40 to further compress the inner assemblies into the O-rings for optimal sealing.

A feature of the invention is that it provides a continuous smooth surface for radiation reflection of incident beams. The surface is the result of conformity of a flexible crystal or amorphous waver to a mold having a predetermined radius of curvature, or more than one radius of curvature in instances where multiple analysis are sought on different radiation sources or on the same radiation source at different energy levels.

FIG. 4 is a schematic depiction of a spherical crystal analyzer at work. It shows a plurality of pixels 28 bonded to a flexible support 20, which itself is reversibly molded to the porous mold 37, as described herein. The proximal or downstream (downstream relative to the incoming radiation beam) pixel surfaces form a continuous symmetrical surface on the substrate. This is the result of a uniform vacuum force applied to the underlying flexible substrate supporting the pixels. Figure error is therefore optimized, such that all pixels are focusing to the same spot on the detector. Enhanced focusing results.

A salient feature of the invention is that each of the pixels assures identical diffraction of incident radiation. Otherwise, bad focus occurs, and bad focus results in bad energy resolution.

All pixels start with the same thickness, the thickness of the crystal wafer; however, once the pixels are etched, a slight variation in thickness might develop, which does not affect the analyzer's performance. The thickness of the pixels is around 2 mm.

Generally, focus size is determined by pixel size such that the size of the image at the detector is twice the depth of the pixel. (The higher the energy utilized, the longer (i.e. thicker or deeper) must be the pixel. Typical pixel depths "D" range from 1 mm to 4 mm.

The radius of the curvature R of the mold, consequently the radius of the analyzer, is equal to the diameter of the so-called Rowland circle, where the detector, sample, and analyzer are positioned along the Rowland circle. The energy and energy resolution of the instrument dictates the radius of curvature R. Typically R=1 m or 2 m.

The following example illustrates the production of spherical crystal analyzers, wherein the porous mold is concave is shape, so as to reversibly produce an identically shaped pixilated crystal substrate 30 during vacuum pull. However, the invention may be applied to other x-ray and optical applications. And it can be utilized to generate other crystal shapes such as elliptical, and cylindrical It can be used to implement a multi-analyzer system to increase efficiency.

EXAMPLE

A working prototype was assembled and is being used for its intended purpose in actual user operation. Table 1 below is a summary of parameters used in fabricating exemplary analyzers. However, it should be noted that the invention is not limited to the crystal material, crystal reflections, radii, shapes, or the x-ray or optical applications of this example.

TABLE 1

| | | |
|---|---|---|
| Energy (keV) | 11.2150 | 8.9808 |
| Analyzer crystal reflection | Si (844) | Ge (337) |
| Bragg angle (degree) | 85.77 | 87.14 |
| Analyzer crystal intrinsic energy resolution (meV) | 14.6 | 36.5 |
| Incident energy resolution (meV) | 15 | 35 |
| Measured energy resolution (including the convolution of the intrinsic and geometrical contributions) (meV) | 29.4 | 56.6 |
| Pixel size (before etching) (mm2) | 1.55 × .1.55 | 1.55 × 1.55 |
| Analyzer illumination diameter opening (mm) | 100 | 100 |
| Bonding method between diced crystal and supporting wafer | Anodic bonding | Glue |
| Etching solution/etching time | 10% $HNO_3$ + 90% HF/10 min | 10% $HNO_3$ + 90% HF/10 min |

The pixelated crystal wafers were prepared as described in detail below:

1) A 2 mm thick double-sided polished crystal wafer with a diameter of 100 mm serves as starting material.
2) One side is diced about halfway through, using a 200-300 μm thick dicing blade. The pixel size depends on the required energy resolution.
3) The diced surface is bonded to a 0.4-0.5 mm thick glass wafer via anodic bonding or a proper adhesive. The bonding method depends on the crystal. The thickness of the glass depends on the bending radius needed. A thickness of 0.4-0.5 mm for the supporting wafer works for 1 m and 2 m radii.
4) The top surface of the wafer is diced using a 100 μm thick blade. The cuts from the top should match the grooves from the bottom to have free-standing pixels.
5) The wafer is etched for 10 minutes at room temperature in a nitric acid (HNO3) and hydrofluoric acid (HF) mixture (93:7 in volume, respectively). Etching requirements, including the type of solution, duration, and temperature, depend on the crystal.

Two analyzers, Si(844) and Ge(337) with intrinsic resolutions of 14.6 meV and 36.5 meV, respectively, were produced with the invented method and characterized in resonant inelastic x-ray scattering (RIXS) measurements. The achieved overall energy resolutions for both analyzers were 29.4 meV for Si(844) and 56.6 meV for Ge(337), closely matching theoretical predictions.

The novel analyzers were found to be equal, if not superior, in quality to their traditional, permanently bonded counterparts.

It is to be understood that the above description is intended to be illustrative, and not restrictive. For example, the above-described embodiments (and/or aspects thereof) may be used in combination with each other. While the example illustrates the characteristics of a fabricated spherical analyzer wafer, the invented method could be expanded to any other shape, including cylindrical lenses.

In addition, many modifications may be made to adapt a particular situation or material to the teachings of the invention without departing from its scope. While the dimensions and types of materials described herein are intended to define the parameters of the invention, they are by no means limiting, but are instead exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the terms "comprising" and "wherein." Moreover, in the following claims, the terms "first," "second," and "third," are used merely as labels, and are not intended to impose numerical requirements on their objects. Further, the limitations of the following claims are not written in means-plus-function format and are not intended to be interpreted based on 35 U.S.C. § 112, sixth paragraph, unless and until such claim limitations expressly use the phrase "means for" followed by a statement of function void of further structure.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," "more than" and the like include the number recited and refer to ranges which can be subsequently broken down into subranges as discussed above. In the same manner, all ratios disclosed herein also include all subratios falling within the broader ratio.

One skilled in the art will also readily recognize that where members are grouped together in a common manner, such as in a Markush group, the present invention encompasses not only the entire group listed as a whole, but each member of the group individually and all possible subgroups of the main group. Accordingly, for all purposes, the present invention encompasses not only the main group, but also the main group absent one or more of the group members. The present invention also envisages the explicit exclusion of one or more of any of the group members in the claimed invention.

The embodiment of the invention in which an exclusive property or privilege is claimed is defined as follows:

1. A method for fabricating radiation analyzers, the method comprising:

a) providing a radiation manipulation material on a first surface of a flexible support;

b) contacting a second surface of the support to a permeable mold, wherein the mold has a first support contact surface and a second surface; and c) applying negative pressure to the second side of the support to cause the radiation manipulation material to reversibly conform to the first support contact surface of the mold.

2. The method as recited in claim 1 wherein the step of applying negative pressure to the second side of the support comprises subjecting substantially the entire second surface of the mold to a vacuum.

3. The method as recited in claim 1 wherein the first support contact surface of the permeable mold defines a topography selected from the group consisting of a sphere, a cylinder, an ellipsoid, a paraboloid and combinations thereof.

4. The method as recited in claim 1 wherein the permeable mold is a rigid material selected from the group consisting of aluminum, glass, ceramic, and combinations thereof.

5. The method as recited in claim 1 wherein the radiation manipulating material comprises crystalline material selected from the group consisting of quartz, germanium, silicon, sapphire, and combinations thereof.

6. The method as recited in claim 1 wherein the radiation manipulating material comprises non-crystalline material selected from the group consisting of metal, glass, polymer, and combinations thereof.

7. The method as recited in claim 1 wherein the radiation manipulating material modifies incident radiation beams, the radiation selected from the group consisting of X-rays, photons, electrons, gamma rays, visible light, UV radiation, IR radiation, and combinations thereof.

8. A system for fabricating analyzers, the system comprising a) radiation manipulating material positioned upon a flexible support;

b) a porous mold reversibly contacting the flexible support, wherein the mold defines a topography; and c) a negative pressure applied to the flexible support to cause the radiation manipulating material to reversibly conform to the topography.

9. The system as recited in claim 8 wherein the topography has a shape selected from the group consisting of a sphere, an ellipsis, a cylinder, a flat plane, a paraboloid and combinations thereof.

10. The system as recited in claim 8 wherein transverse extending pores are homogeneously distributed throughout the porous mold.

11. The system as recited in claim 8 wherein the radiation reflecting material is crystalline material selected from the group consisting of quartz, silicon, germanium, sapphire, and combinations thereof.

12. The system as recited in claim 8 wherein the radiation reflecting material is noncrystalline material selected from the group consisting of glass, metal, ceramic, polymer, and combinations thereof.

13. The system as recited in claim 8 wherein the negative pressure ranges from $10^{-2}$ mBar to $10^{-6}$ mBar.

14. The system as recited in claim 8 wherein the flexible support is positioned between the radiation reflecting material and the porous mold and the flexible support is nonporous such that the negative pressure is not in fluid communication with the radiation reflecting material.

15. The system as recited in claim 8 wherein the negative pressure is an applied vacuum.

16. The system as recited in claim 8 wherein the analyzer is adapted to resolve radiation energies between 1 meV and 1000 meV.

17. A system for fabricating analyzers, the system comprising a) radiation manipulating material positioned upon a flexible support;

b) a porous mold reversibly contacting the flexible support, wherein the mold defines a topography; and c) a negative pressure applied to the flexible support to cause radiation reflecting material to conform to the topography, wherein the porous mold is a rigid material selected from the group consisting of metal, glass, plastic, ceramic and combinations thereof and has apertures ranging from 5 microns to 25 microns.

18. The system as recited in claim 8 wherein the negative pressure is applied via a vacuum pump.

19. The system as recited in claim 18 wherein the vacuum pump is disconnected from the system.

20. The system as recited in claim 8 wherein the porous mold has a radius of curvature ranging from 10 mm to infinity.

21. The method as recited in claim 1 wherein the radiation manipulation material comprises a plurality of individual crystals, wherein each of the crystals define a six sided shape having side surfaces opposing adjacent crystals, a upwardly facing surface, and a downwardly facing surface contacting the support substrate.

22. The system as recited in claim 8 wherein the radiation manipulation material comprises a plurality of individual crystals, wherein each of the crystals define a six sided shape having side surfaces opposing adjacent crystals, a upwardly facing surface, and a downwardly facing surface contacting the support substrate.

* * * * *